United States Patent
Sabi et al.

(10) Patent No.: US 6,538,960 B1
(45) Date of Patent: Mar. 25, 2003

(54) MAGNETO-OPTICAL RECORDING MEDIUM HAVING A METAL HEAT DISPERSION LAYER

(75) Inventors: Yuichi Sabi, Tokyo (JP); Kimitaka Kawase, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/612,233

(22) Filed: Jul. 7, 2000

(30) Foreign Application Priority Data

Jul. 9, 1999 (JP) .......................... 11-196745

(51) Int. Cl.[7] .............................. G11B 11/00
(52) U.S. Cl. ................. 369/13.38; 428/64.3; 369/13.53
(58) Field of Search ........................ 369/13.38, 13.35, 369/13.39, 13.4, 13.53; 428/64.3, 64.1, 694 ML, 694 MM

(56) References Cited

U.S. PATENT DOCUMENTS

| 5,552,237 A | * | 9/1996 | Utsunomiya et al. | 428/694 ML |
| 5,577,021 A | * | 11/1996 | Nakatani et al. | 369/13.38 |
| 5,700,567 A | * | 12/1997 | Utsunomiya | 369/13.38 |
| 5,702,793 A | | 12/1997 | Shimokawa et al. | |
| 5,786,078 A | * | 7/1998 | Sekiya et al. | 369/13.38 |

FOREIGN PATENT DOCUMENTS

| EP | 0487275 A2 | 5/1992 |
| EP | 0523944 A2 | 1/1993 |
| EP | 05258368 | 8/1993 |
| EP | 0586175 A1 | 3/1994 |
| EP | 0632437 A3 | 1/1995 |
| EP | 0632437 A2 | 1/1995 |
| EP | 0652556 A2 | 5/1995 |
| EP | 0844607 A2 | 5/1998 |

* cited by examiner

Primary Examiner—Tan Dinh
(74) Attorney, Agent, or Firm—Sonnenschein, Nath & Rosenthal

(57) ABSTRACT

A magneto-optical recording medium, which is for recording and reproduction of information by focusing of light of a wavelength/numerical aperture of about 1000 nm or less, has a light transmitting first dielectric layer having a first surface to which light strikes. A magneto-optical recording layer is formed on a back surface of the first surface of the first dielectric layer. A light transmitting metal layer is formed on the magneto-optical recording layer to a predetermined thickness required for dispersion of heat (about 10 nm or more) from the magneto-optical recording layer and having a larger heat conductivity than the magneto-optical recording layer. A light transmitting second dielectric layer is formed on the light transmitting metal layer. A metal reflective layer is formed on the second dielectric layer and reflects the light.

18 Claims, 10 Drawing Sheets

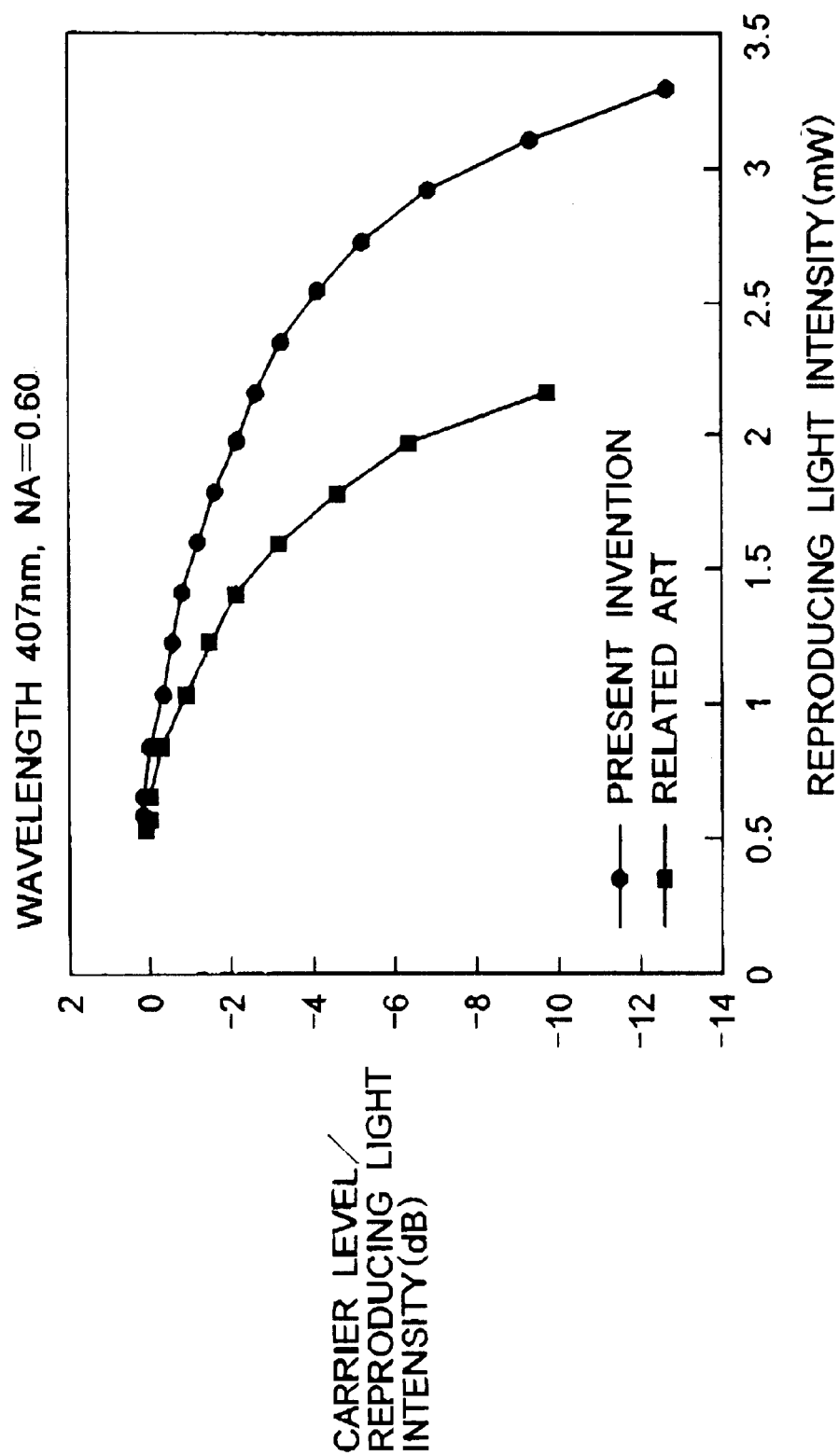

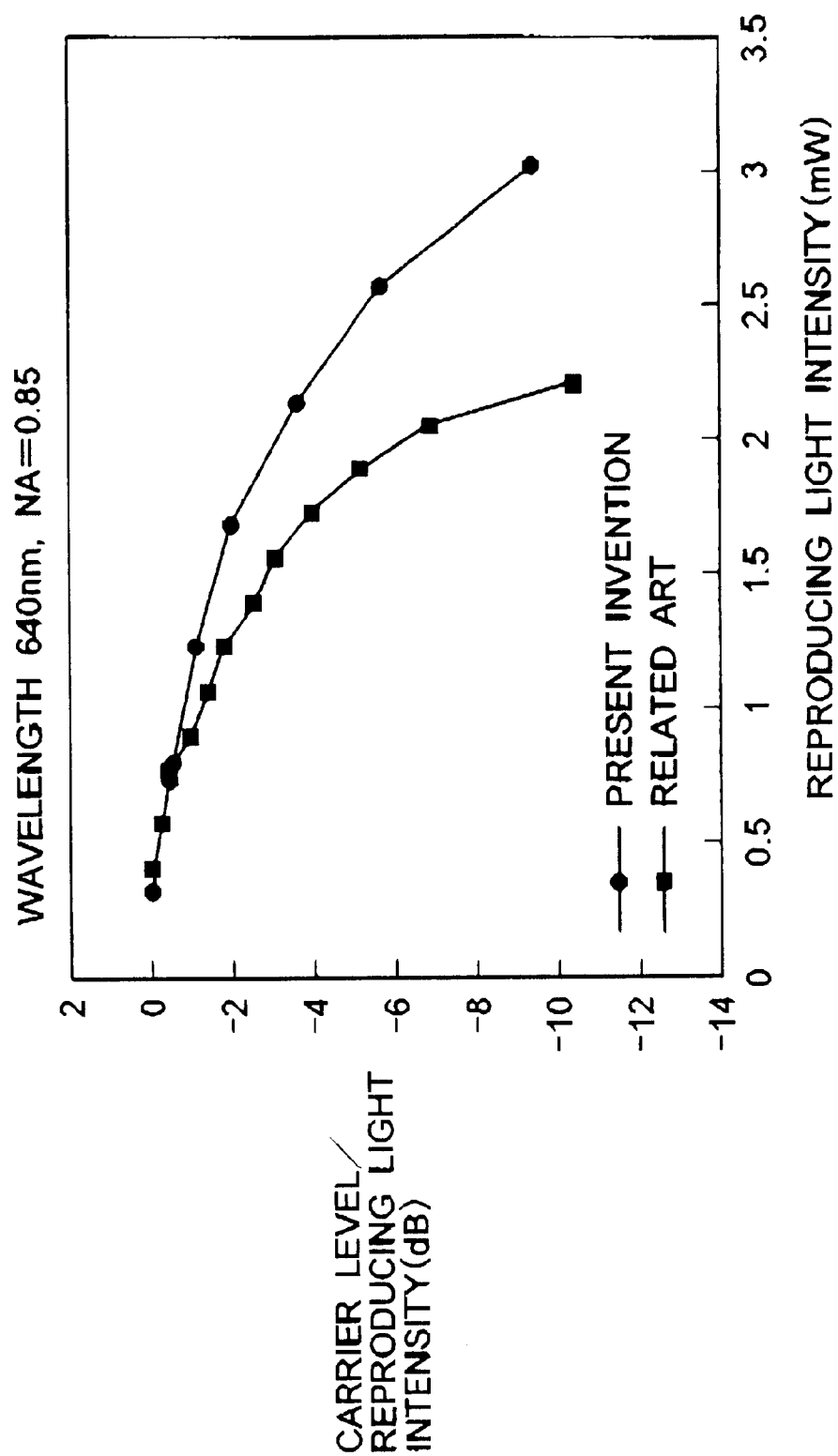

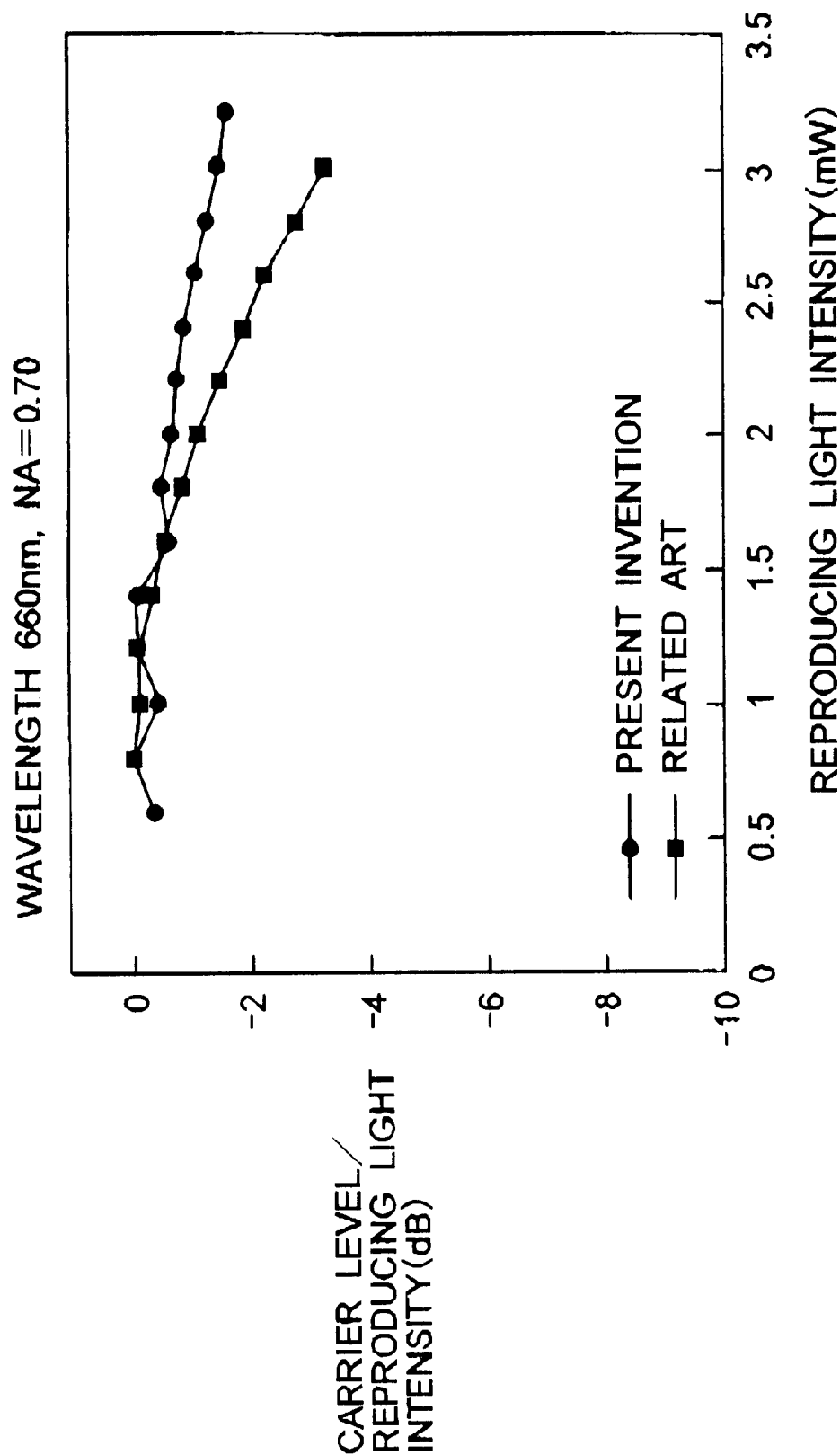

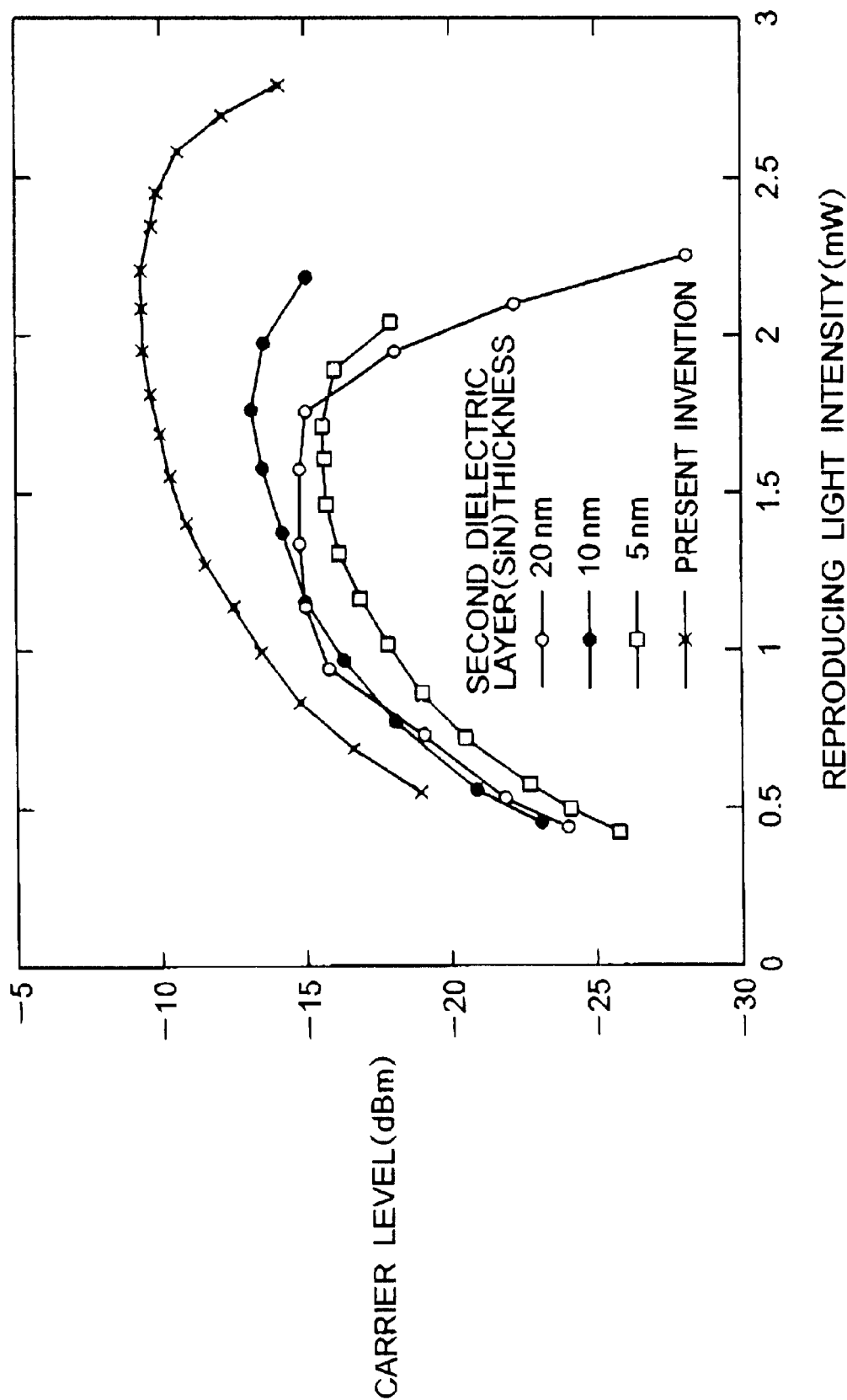

MAGNETO-OPTICAL RECORDING MEDIUM HAVING A METAL HEAT DISPERSION LAYER

RELATED APPLICATION DATA

The present application claims priority to Japanese Application No. P11-196745 filed Jul. 9, 1999; which application is incorporated herein by reference to the extent permitted by law.

BACKGROUND OF THE INVENTION

1. Field of the Invention

The present invention relates to a magneto-optical recording medium for an optical system having a wavelength/numerical aperture (NA) of lens of not more than about 1000 nm and a method of producing the same, more particularly a magneto-optical recording medium suppressed in temperature rise and improved in the heat characteristics without reducing the optical characteristics and a method of producing the same.

2. Description of the Related Art

An ordinary magneto-optical recording medium, for example, a magneto-optical disk is structured by, as shown in a cross-sectional view of FIG. 1, for example a light transmitting substrate 1 on which are successively stacked a light transmitting first dielectric layer 2 comprised of SiN of a thickness of 80 nm to 100 nm, a magneto-optical recording layer 3 comprised of for example TbFeCo, a light transmitting second dielectric layer 4 comprised of for example SiN of a thickness of 20 nm to 40 nm, and a metal reflective layer 5 comprised of Al of a thickness of 50 nm to 60 nm. In the magneto-optical recording medium of the structure shown in FIG. 1, the light L strikes from the substrate 1 side and the light L is mainly reflected at the interface between the second dielectric layer 4 and the metal reflective layer 5. A reflected light of the light L is detected by a detector and converted into an electric signal.

The magneto-optical recording layer 3 is made light transmitting by setting the thickness to not more than 30 nm, for example, 15 nm to 25 nm. Since an enhancement effect of the Kerr effect can be obtained by using multiple interference between the magneto-optical recording layer 3 and the metal reflective layer 5, the magneto-optical recording layer 3 has the advantage that the reflectance R can be lowered with the optical performance index, that is, $R \cdot \theta_K$ (R is the reflectance, $\theta_K$ is the Kerr rotation angle) kept constant. Also, if the combination of the magneto-optical recording layer 3 and the metal reflective layer 5 is suitably selected, it is possible to prevent a temperature rise in the magneto-optical recording layer 3 and design for the optimal heat characteristics.

Below, the optical aspects and heat aspects of the above conventional magneto-optical recording medium will be explained in detail.

First, the optical aspects of the above magneto-optical recording medium will be explained. If the optical performance index is fixed when changing the film configuration, the amplitude of the signal and disk noise are kept at a constant level and the S/N does not change. In a magneto-optical disk, shot noise is predominant in a high frequency region. Also, since the shot noise level is proportional to the square root of a light quantity detected on a detector detecting the signal, the lower the reflectance, the lower the shot noise level. Therefore, the lower the reflectance can be made in the design within the range which the heat characteristics and the servo characteristics can allow, the more the SIN, especially the high-frequency characteristics, are improved.

A decrease of reflectance can be realized by coating a SiN dielectric layer and a thick magneto-optical recording layer on a substrate. However, in this case, even if the thickness of the SiN dielectric layer is changed, the reflectance will not become lower than 20%. To lower the reflectance further, a configuration making the thickness of the magneto-optical recording layer not more than 30 nm and arranging a reflective layer via the dielectric layer is effective. Particularly, when the thickness of the magneto-optical recording layer is made not more than 20 nm, the transmittance of light increases. Therefore, it becomes possible to change the reflectance in a wide range by using multiple interference between the magneto-optical recording layer and the reflective layer. As the reflective layer, a metal of a high reflectance mainly comprised of Al is usually used.

Next, the heat aspects of the above magneto-optical recording medium will be explained. From the heat aspects, the heat characteristics of the magneto-optical recording layer are controlled by suitably selecting the thicknesses of the metal reflective layer and the second dielectric layer.

However, according to the conventional magneto-optical recording medium having the above film configuration, it is difficult to sufficiently control the heat characteristics.

Along with the increasing higher density of magneto-optical recording media in these years, the spot size of light has been made smaller in diameter. Therefore, when raising the intensity of the reproducing light and repeatedly reproducing information, the recording marks are sometimes lost and information recorded on the medium erased. Especially when using a light source of a short wavelength or an optical system having an NA over 0.7, the photo-absorption concentrates at the surface of the magneto-optical recording layer. Thus the temperature of the magneto-optical recording medium including the magneto-optical recording layer rises before the heat reaches the metal reflective layer and disperses.

Generally, in a metal film, when reducing its thickness, the heat conductivity decreases due to the decrease in the mean free path of electrons. It is known that the heat conductivity drastically decreases when the thickness is made about 30 nm or less. In a magneto-optical recording layer comprised of TbFeCo or another metal layer as well, when the thickness of the magneto-optical recording layer is made 30 nm or less as described above in order to maintain the optical characteristics, the rise of temperature due to decrease in the heat conductivity becomes a problem.

As described above, in a magneto-optical recording medium, there is a problem that it is difficult to achieve both of maintenance of the optical performance index and prevention of temperature rise.

Further, when using a light source of a short wavelength of not more than 490 nm and/or an optical system having an NA over 0.7, the rise of temperature in the magneto-optical recording layer becomes remarkable. Therefore, when the second dielectric layer is formed thinly at a thickness of for example about 10 nm, the dispersion of heat from the magneto-optical recording layer becomes insufficient. Then, the problem rises in that the heat control of the magneto-optical recording layer becomes impossible.

SUMMARY OF THE INVENTION

The present invention was made in consideration of the above problem. Therefore, the present invention has as its object to provide a magneto-optical recording medium maintained in the optical performance index and improved in the heat characteristics and a method of producing the same.

To achieve the above object, the magneto-optical recording medium of the present invention is a magneto-optical recording medium for recording and reproduction of information by focusing of light of a microspot diameter, characterized by comprising a first light transmitting dielectric layer to a first surface of which the light strikes; a magneto-optical recording layer formed on a second surface opposed to the first surface of the first dielectric layer; a light transmitting metal layer formed on the magneto-optical recording layer to a predetermined thickness required for dispersion of heat from the magneto-optical recording layer and having a larger heat conductivity than the magneto-optical recording layer; a second light transmitting dielectric layer formed on the light transmitting metal layer; and a metal reflective layer formed on the second dielectric layer and reflecting light.

The magneto-optical recording medium of the present invention preferably is characterized in that the light of a microspot diameter is light from an optical system of which a ratio of (wavelength)/(numerical aperture (NA) of lens) is not more than about 1000 nm. Also, the magneto-optical recording medium of the present invention preferably is characterized in that the predetermined thickness of the light transmitting metal layer is not less than about 10 nm.

The magneto-optical recording medium of the present invention preferably is characterized in that the upper limit of the thickness of the light transmitting metal layer is set within a range where at least part of the light striking the light transmitting metal layer from the first surface side passes through the light transmitting metal layer to strike the second dielectric layer.

The magneto-optical recording medium of the present invention further preferably is characterized in that the upper limit of the thickness of the light transmitting metal layer is about 60 nm.

Also, the magneto-optical recording medium of the present invention preferably is characterized in that the light transmitting metal layer is comprised of a metal having a large reflectance with respect to light. The magneto-optical recording medium of the present invention further preferably is characterized in that the light transmitting metal layer contains Al. Alternatively, the magneto-optical recording medium of the present invention further preferably is characterized in that the light transmitting metal layer contains Ag.

The magneto-optical recording medium of the present invention preferably is characterized by further comprising a substrate on the first surface of the first dielectric layer. Alternatively, the magneto-optical recording medium of the present invention preferably is characterized by further comprising a substrate at the surface of the metal reflective layer at the side opposite to the side which the light strikes.

Due to this, it becomes possible to promote effective dispersion of heat from the magneto-optical recording layer and it is possible to improve the heat characteristics of a mageto-optical recording medium. According to the magneto-optical recording medium of the present invention, a light transmitting metal layer having a thickness of 10 nm or more is formed between the magneto-optical recording layer and the metal reflective layer next to the magneto-optical recording layer. Then, the magneto-optical recording layer and the light transmitting metal layer share conductive electrons in charge of conduction of heat and the substantive heat conductivity of the magneto-optical recording layer increases. Therefore, the local temperature rise of the magneto-optical recording layer due to focusing of light is suppressed.

Generally, when making a metal film thinner, due to the decrease of the mean free path of electrons, the heat conductivity decreases. However, according to the magneto-optical recording medium of the present invention, the thickness of the light transmitting metal layer can be made greater within the range where there is light transmissiveness. Therefore, it is possible to raise further the heat conductivity of the magneto-optical recording layer by thickening the light transmitting metal layer. Also, this effect becomes more effective the higher the heat conductivity of the light transmitting metal layer.

Also, according to the magneto-optical recording medium of the present invention, by using multiple interference between the light transmitting magneto-optical recording layer and the metal reflective layer, the optical performance index of $R \cdot \theta_K$ (R is the reflectance, $\theta_K$ is the Kerr rotation angle) can be kept constant. Therefore, when forming the light transmitting metal layer having the above thickness, the optical characteristics of the magneto-optical recording layer are not impaired.

To achieve the above object, the method of producing a magneto-optical recording medium of the present invention is a method of producing a magneto-optical recording medium for recording and reproduction of information by focusing of light of a short wavelength or high NA, said method comprising the steps of forming a light transmitting first dielectric layer on the surface of the light transmitting substrate at the side opposite to the side which the light strikes; forming a magneto-optical recording layer on the first dielectric layer; forming on the mangneto-optical recording layer a light transmitting metal layer having a predetermined thickness required for dispersion of heat from the magneto-optical recording layer and a larger heat conductivity than the magneto-optical recording layer; forming a light transmitting second dielectric layer on the light transmitting metal layer; and forming a metal reflective layer reflecting light on the second dielectric layer.

The method of producing a magneto-optical recording medium of the present invention preferably is characterized in that the steps of forming the first dielectric layer, the magneto-optical recording layer, the light transmitting metal layer, the second dielectric layer, and the metal reflective layer comprise forming layers by sputtering.

The method of producing a magneto-optical recording medium of the present invention further preferably is characterized in that each of the sputtering steps is performed in the same apparatus.

The method of producing a magneto-optical recording medium of the present invention preferably is characterized by further comprising the step of flattening a surface of the light transmitting metal layer after the step of forming the light transmitting metal layer. The method of producing a magneto-optical recording medium of the present invention further preferably is characterized in that the step of flattening the surface of the light transmitting metal layer comprises the step of reverse sputtering. The method of producing a magneto-optical recording medium of the present invention preferably is characterized in that the steps of forming the first dielectric layer, the magneto-optical recording layer, the light transmitting metal layer, the second dielectric layer, and the metal reflective layer comprise forming layers by sputtering, and the reverse sputtering is performed in the same apparatus as the sputtering steps.

According to the method of producing a magneto-optical recording medium of the present invention, since it is possible to continuously form the first dielectric layer, the magneto-optical recording layer, the light transmitting metal layer, the second dielectric layer, and the metal reflective layer on the substrate, only the step of forming the light transmitting metal layer has to be added to the conventional production steps of a magneto-optical recording medium. That is, the production steps are not complicated compared with the conventional method of production and no new facilities etc. are required.

Further, when flattening the surface of the light transmitting metal layer by reverse sputtering in the method of producing a magneto-optical recording medium of the present invention, it is possible to improve the surface condition of the light transmitting metal layer with a simple step and decrease noise due to roughness of the surface.

Also, to achieve the above object, the method of producing a magneto-optical recording medium of the present invention is a method of producing a magneto-optical recording medium for recording and reproduction of information by focusing of light of a short wavelength or high NA, comprising the steps of forming a metal reflective layer reflecting the light on a surface of the substrate at the side which the light is focused on; forming a light transmitting second dielectric layer on the metal reflective layer; forming on the second dielectric layer a light transmitting metal layer having a predetermined thickness required for dispersion of heat from a magneto-optical recording layer and a larger heat conductivity than the magneto-optical recording layer; forming the mageto-optical recording layer on the light transmitting metal layer; and forming a light transmitting first dielectric layer on the magneto-optical recording layer.

The method of producing a magneto-optical recording medium of the present invention preferably is characterized in that the steps of forming the metal reflective layer, the second dielectric layer, the light transmitting metal layer, the magneto-optical recording layer, and the first dielectric layer comprise forming layers by sputtering. The method of producing a magneto-optical recording medium of the present invention further preferably is characterized in that each of the sputtering steps is performed in the same apparatus.

The method of producing a magneto-optical recording medium of the present invention preferably is characterized by comprising the step of flattening a surface of the light transmitting metal layer after the step of forming the light transmitting metal layer. The method of producing a magneto-optical recording medium of the present invention preferably is characterized in that the step of flattening the surface of the light transmitting metal layer comprises the step of reverse sputtering. The method of producing a magneto-optical recording medium of the present invention preferably is characterized in that the steps of forming the first dielectric layer, the magneto-optical recording layer, the light transmitting metal layer, the second dielectric layer, and the metal reflective layer comprise forming layers by sputtering, and the reverse sputtering is performed in the same apparatus as the sputtering steps.

According to the method of producing a magneto-optical recording medium of the present invention, since it is possible to continuously form the metal reflective layer, the second dielectric layer, the light transmitting metal layer, the magneto-optical recording layer, and the first dielectric layer on the substrate, only the step of forming the light transmitting metal layer has to be added to the conventional production steps of a magneto-optical recording medium. That is, the production steps are not complicated compared with the conventional method of production and no new facilities etc. are required.

Further, when flattening the surface of the light transmitting metal layer by reverse sputtering in the method of producing a magneto-optical recording medium of the present invention, it is possible to improve the surface condition of the light transmitting metal layer with a simple step and decrease noise due to roughness of the surface.

BRIEF DESCRIPTION OF THE DRAWINGS

These and other objects and features of the present invention will become clearer from the following description of the preferred embodiments given with reference to the accompanying drawings, in which:

FIG. 7A is a view showing the dependency of the carrier level on the intensity of reproducing light and comparing the disk of the present invention with the disk of the conventional structure in an optical system of wavelength 407 nm and NA 0.60;

FIG. 7B is the view in an optical system of 640 nm and NA 0.85;

FIG. 7C is the view in an optical system of 660 nm and NA 0.70;

FIG. 9 is a graph showing the dependency of the carrier level on the intensity of the reproducing light according to the fourth embodiment of the present invention and comparing the conventional structure wherein the second dielectric layer is made thin with the structure of the present invention.

DESCRIPTION OF THE PREFERRED EMBODIMENTS

Below, embodiments of the magneto-optical recording medium and the method of producing the same of the present invention will be explained with reference to the drawings.

(First Embodiment)

Figure 2:
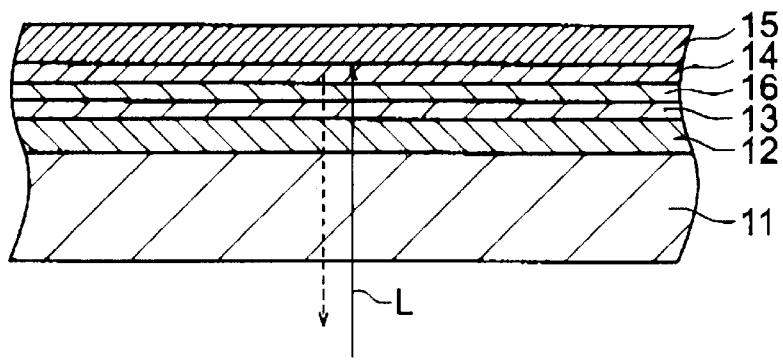
FIG. 2 is a cross-sectional view of a magneto-optical recording medium according to a first embodiment of the present invention.

FIG. 2 is a cross-sectional view of a magneto-optical recording medium of the present embodiment. Light L is focused on it from the substrate 11 side. As shown in FIG. 2, the magneto-optical recording medium of the present embodiment is structured by a light transmitting substrate 11 on which are successively stacked a light transmitting first dielectric layer 12, a magneto-optical recording layer 13, a light transmitting metal layer 16, a light transmitting second dielectric layer 14, and a metal reflective layer 15. The above magneto-optical recording medium of the present embodiment is characterized by comprising the light transmitting metal layer 16 with its thickness suitably controlled.

Here, "light transmitting" in the present invention means that a required transmittance is exhibited with respect to reproducing light of a predetermined wavelength which is focused on the magneto-optical recording medium.

As the substrate 11, for example, a glass substrate, a plastic substrate comprised of epoxy resin, etc. or a protective layer comprised of those materials can be used.

The first dielectric layer 12 and the second dielectric layer 14 are set to a thickness able to give an adequate enhancement effect in accordance with the wavelength of a light source being used. The first and second dielectric layers 12, 14 are configured by for example SiN. The first dielectric layer 12 can be set to a thickness of for example 60 nm to 100 nm and the second dielectric layer 14 can be set to a thickness of for example 20 nm to 40 nm.

The magneto-optical recording layer 13 is comprised of for example TbFeCo. As described above, since the shot noise level is decreased by decreasing the reflectance, the thickness of the magneto-optical recording layer 13 is set to 30 nm or less, preferably for example around 20 nm or 15 nm to 25 nm.

The light transmitting metal layer 16 is comprised by a metal material having a larger dispersion of heat and a higher reflectance compared with the magneto-optical recording layer 13 and arranged at the opposite side of the magneto-optical recording layer 13 to the side where the light strikes.

The light transmitting metal layer 16 has the role of sharing heat conducting electrons with the magneto-optical recording layer 13 by being arranged next to the magneto-optical recording layer 13. That is, electrons in charge of heat conduction can be transmitted over the interface between the magneto-optical recording layer 13 and the light transmitting metal layer 16, thus the substantive heat conductivity of the magneto-optical recording layer 13 can be increased.

Also, the light transmitting metal layer 16 is set to a thickness of 10 nm to 100 nm, preferably 10 nm to 60 nm. This is because the amount of the incident light passing through the light transmitting metal layer 16 becomes extremely small when exceeding 60 nm, so the metal reflective layer 15 becomes unnecessary and it is not necessary to make the film configuration one of a magneto-optical recording medium of the present invention.

Figure 3:
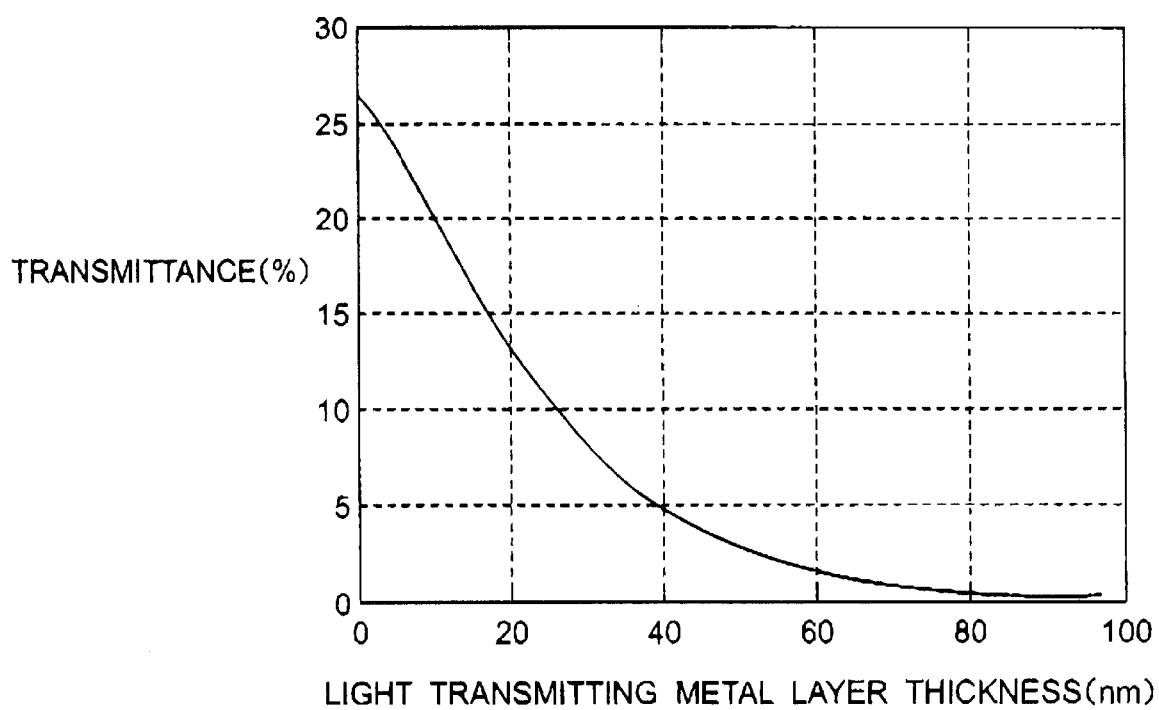
FIG. 3 is a graph showing the correlation of the thickness of the light transmitting metal layer and transmittance according to the first embodiment of the present invention.

FIG. 3 shows the relation of the thickness of the light transmitting metal layer and the transmittance. FIG. 3 shows the transmittance in the case of using stacked layers of a substrate, a first dielectric layer (SiN, 43 nm), a magneto-optical recording layer (15 nm), and a light transmitting metal layer (Ag) as a model system of the magneto-optical recording medium of the present embodiment and changing the thickness of the light transmitting metal layer.

As shown in FIG. 3, when the thickness of the light transmitting metal layer becomes about 100 nm, the transmittance becomes almost 0%, but when the thickness exceeds 60 nm, the transmittance becomes 1 to 2% or less, thus the intensity of the transmitted light can be substantively ignored. On the other hand, when the thickness of the magneto-optical recording layer is increased within the range where the magneto-optical recording layer has light transmissiveness, for example, 25 nm, the entire curve in FIG. 3 shifts in the direction of decreasing the transmittance. Therefore, the thickness of the light transmitting metal layer when the transmittance becomes 0 or several % becomes smaller than the case of FIG. 3. The upper limit of the thickness of the light transmitting metal layer is set as above from the viewpoint of transmittance.

Also, the reason for setting the upper limit of the thickness of the light transmitting metal layer to 60 nm is because the dispersion of heat becomes excessive when the above thickness exceeds about 60 nm and a high intensity of light for focusing becomes required.

On the other hand, the reason for setting the lower limit of the thickness of the light transmitting metal layer to 10 nm is because it has been found that the above described enhancement effect of the substantive heat conductivity of the magneto-optical recording layer 13 becomes hard to obtain for a microspot of a wavelength/NA of not more than about 1000 nm when the above thickness is less than 10 nm. In other words, for an optical system of a wavelength/NA of 1000 nm or more, a sufficient effect can be obtained by a thickness of 10 nm or less.

The light transmitting metal layer 16 is comprised of a metal having a sufficiently large reflectance at a wavelength of 490 nm or shorter, for example Ag or Al. Also, it is possible to make a composition with another metal added to those metals. For example, it is also possible to use Ti-added Al and use Ag added with Pd, etc. for the purpose of moisture proofing or mechanical protection.

Information recorded on the above magneto-optical recording medium is read by focusing of laser light L as a reproducing light using a known optical pick-up device. When focusing the laser light L on the magneto-optical recording layer 13, the reproducing light is rotated with Kerr rotation in accordance with the information recorded on the magneto-optical recording layer, that is, the direction of magnetization. The reproducing light is reflected at the interface between the second dielectric layer 14 and the metal reflective layer 15 and then the information is read by detecting the return light of the reproducing light.

According to the magneto-optical recording medium of the present embodiment, a light transmitting metal layer 16 having a larger heat dispersion than the magneto-optical recording layer 13 is arranged next to the magneto-optical recording layer 13. Due to this, the substantive heat conductivity of the magneto-optical recording layer 13 can be increased. When focusing reproducing light on the magneto-optical recording layer 13, since energy absorbed locally at the magneto-optical recording layer 13 disperses quickly, the local rise of temperature at the magneto-optical recording layer 13 is avoided. Therefore, the intensity of the reproducing light can be increased and the C/N can be improved.

Also, as described above, by arranging the light transmitting metal layer 16 between the magneto-optical recording layer 13 and the metal reflective layer 15, it is possible to prevent a decline of the optical performance index of the magneto-optical recording medium.

The light transmitting metal layer 16 is a light transmitting layer having a thickness of 60 nm or less and is comprised of Al, Ag, or another metal having a high reflectance. Therefore, it can be regarded that the reflective layer in the enhancement structure is separated into two layers, thus an enhancement effect of the Kerr effect is obtained in the same manner as the above described conventional magneto-optical recording medium.

Next, an explanation will be given of the method of producing the magneto-optical recording medium of the present embodiment described above. According to the method of producing of the present embodiment, a magneto-optical recording medium having a configuration where light strikes from the substrate 11 side shown in FIG. 2 is formed.

First, on the light transmitting substrate 11, the above described light transmitting first dielectric layer 12, the magneto-optical recording layer 13, and the light transmitting metal layer 16 having a thickness of 10 nm to 60 nm and a larger dispersion of heat than the magneto-optical recording layer 13 are sequentially formed by first continuous sputtering.

After this, reverse sputtering is performed on the light transmitting metal layer 16 for flattening treatment for flattening the surface of the light transmitting metal layer 16. Due to the flattening treatment, it is possible to decrease the noise caused by random reflection at the surface.

Next, the light transmitting second dielectric layer 14 and the metal reflective layer 15 are sequentially formed on the light transmitting metal layer 16 by second continuous sputtering.

The above first continuous sputtering, the reverse sputtering, and the second continuous sputtering can be performed continuously in the same sputtering apparatus, thus it is not necessary to unload the stacked layers from the apparatus at each time between the steps.

According to the method of producing a magneto-optical recording medium of the present invention, it is possible to form the first dielectric layer 12, the magneto-optical recording layer 13, the light transmitting metal layer 16, the second dielectric layer 14, and the metal reflective layer 15 and flatten the surface of the light transmitting metal layer 16 in a series of processes. Therefore, it is possible to form the light transmitting metal layer 16 and perform a flattening treatment on the surface of it without complicating the work in the conventional method of producing a magneto-optical recording medium.

(Second Embodiment)

In the magneto-optical recording medium of the above first embodiment, as shown in FIG. 2, the substrate 11 is comprised of a light transmitting substrate and light L is focused from the substrate 11 side. However, the magneto-optical recording medium of the present invention can also be configured with the light L, for example, the reproducing light, focused from the opposite side of the substrate 11. Below, an embodiment of the case in which light L is focused from the opposite side of the substrate 11 will be explained.

Figure 4:
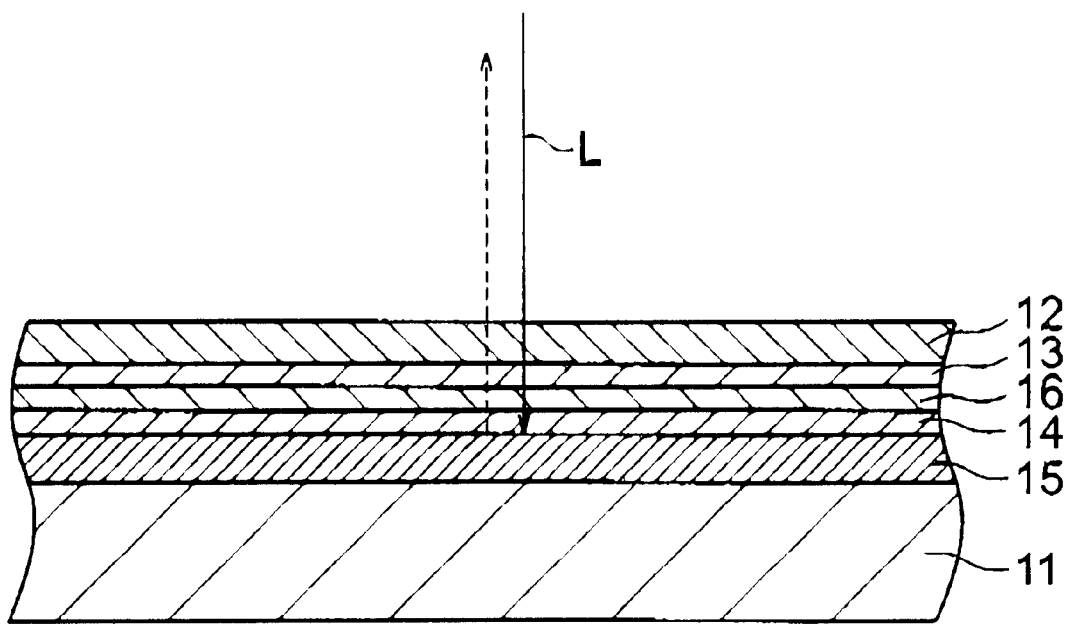
FIG. 4 is a cross-sectional view of a magneto-optical recording medium according to a second embodiment of the present invention.

FIG. 4 is a cross-sectional view of a magneto-optical recording medium of the present embodiment. In FIG. 4, parts corresponding to those in FIG. 2 are given the same references as in FIG. 2. In the second embodiment, the substrate 11 is not limited to a substrate having light transmissiveness. The magneto-optical recording medium of the present embodiment, as shown in FIG. 4, is configured by a metal reflective layer 15, a second dielectric layer 14, a light transmitting metal layer 16, a magneto-optical recording layer 13, and a first dielectric layer 12 stacked on the substrate 11.

In the magneto-optical recording medium of the present embodiment, a light transmitting metal layer 16 having a larger dispersion of heat than the magneto-optical recording layer 13 is also arranged next to the magneto-optical recording layer 13. Due to this, the substantive heat conductivity of the magneto-optical recording layer 13 can be increased. When focusing reproducing light on the magneto-optical recording layer 13, since the locally absorbed energy at the magneto-optical recording layer 13 disperses quickly, a local temperature rise at the magneto-optical recording layer 13 is avoided. Therefore, the intensity of the reproducing light can be increased and the C/N can be improved.

Also, as described above, by arranging the light transmitting metal layer 16 between the magneto-optical recording layer 13 and the metal reflective layer 15, it is possible to prevent a decline of the optical performance index of the magneto-optical recording medium.

Next, an embodiment of a method of production of the above magneto-optical recording medium of the present embodiment will be explained. According to the method of production of the present embodiment, a magneto-optical recording medium having a configuration wherein the light strikes from the opposite side of the substrate 11 shown in FIG. 4 is formed.

First, the metal reflective layer 15, the second dielectric layer 14, and the light transmitting metal layer 16 are sequentially formed on the light transmitting or light shielding substrate 11 by the first continuous sputtering.

Next, reverse sputtering is applied on the light transmitting metal layer 16 for a flattening treatment for flattening the surface of the light transmitting metal layer 16. Due to the flattening treatment, it is possible to decrease the noise caused by random reflection at the surface.

After this, the magneto-optical recording layer 13 and the first dielectric layer 12 are sequentially formed on the light transmitting metal layer 16 by the second continuous sputtering.

In the present embodiment too, the above first continuous sputtering, the reverse sputtering, and the second continuous sputtering can be performed continuously in the same sputtering apparatus, thus it is not necessary to unload the stacked layers from the apparatus at each time between the steps. Therefore, it is possible to form the light transmitting metal layer 16 and perform a flattening treatment on the surface of it without complicating the work of the conventional method of producing a magneto-optical recording medium.

(Third Embodiment)

Next, the specific configurations and characteristics of a magneto-optical recording medium of the present invention and of the conventional structure will be explained by comparison.

The magneto-optical recording medium of the present invention is structured as shown in FIG. 2 and is configured by a first dielectric layer comprised of SiN, a magneto-optical recording layer comprised of TbFeCo of a thickness of 15 nm, a light transmitting metal layer comprised of Ag, a second dielectric layer comprised of SiN of a thickness of 20 nm. and a metal reflective layer comprised of Ag of a thickness of 100 nm sequentially stacked on a glass substrate. The thickness of the light transmitting metal layer was made one of five types (0, 4, 8, 12, 16 nm) within a range of 0 to 16 nm. The results were designated as Samples 1 to 5 in increasing order of the thickness. Sample 1 without the light transmitting metal layer is equivalent to the conventional structure (see FIG. 1). Also, the thicknesses of the first dielectric layers were set for making Samples 1 to 5 the same reflectances using the multiple interference effect.

The wavelength of light focused on each magneto-optical recording medium described above was set to 400 nm.

In this case, the optical constants (the refractive index n, the quenching coefficient k) of the material in the layers configuring these magneto-optical recording media were set to the values in Table 1. Here, n+ and k+ represent the refractive index and quenching coefficient of a right-handed polarized light respectively, n− and k− represent the refractive index and quenching coefficient of a left-handed polarized light respectively.

TABLE 1

Optical Constants at Wavelength of 400 nm

| Material | Refractive index n | Quenching coefficient k |
|---|---|---|
| TbFeCo | n+ : 2.2245 | k+ : 2.9769 |
|  | n− : 2.2413 | k− : 3.0280 |
| Ag | 0.173 | 1.95 |
| SiN | 2.0 | 0 |

Table 2 shows the results of calculation of the enhancement of the above Samples 1 to 5 at a wavelength of 400 nm.

TABLE 2

Calculation of Enhancement at Wavelength of 400 nm

| Sample | Light transmitting metal layer thickness (nm) | First dielectric layer thickness (nm) | Reflectance (%) | Kerr rotation angle (°) | Kerr ellipticity (°) |
|---|---|---|---|---|---|
| 1 | 0 | 58 | 12.6 | 0.853 | 0.459 |
| 2 | 4 | 54 | 12.0 | 0.909 | 0.387 |
| 3 | 8 | 52 | 12.5 | 0.906 | 0.325 |
| 4 | 12 | 50 | 12.7 | 0.907 | 0.283 |
| 5 | 16 | 48 | 12.7 | 0.913 | 0.257 |

From Table 2, it is learned that in Samples 2 to 5 having the structure of the present invention, equal optical characteristics to that of Sample 1 of the conventional structure are obtained and the performance index ($R \cdot \theta_K$) is maintained when the thicknesses of the light transmitting metal layer and the first dielectric layer are changed.

Next, the heat characteristics of the magneto-optical recording media of the present invention and the prior art will be explained. In this case, the measurement of the heat conductivity is difficult and the reliability of measurement data is hard to obtain. Therefore, here, each sample was actually prepared and actually measured using a magneto-optical evaluating apparatus. The heat characteristics were evaluated based on data from the measurement.

The various conditions in the evaluating system were set as follows: a numerical aperture NA=0.60, a wavelength of light of 407 nm, a track pitch of 0.50 μm, a recording mark length of 0.28 μm, and a linear velocity of 4.62 m/sec. In this case, the wavelength/NA is about 680 nm. Also, the fluctuation was evaluated when recording random data of (1,7) modulation using the recording mark length as the shortest mark.

Also, in the samples of the above measurement, $Tb(Fe_{90}Co_{10})$ and $Tb(Fe_{85}Co_{15})$ were used as the material of the magneto-optical recording layer. In these materials, the higher the composition ratio of Co, the higher the Curie temperature and the higher the intensity of recording light necessary. Also, the above sample is configured with light transmitting metal layer comprised of Ag arranged contacting the magneto-optical recording layer.

Figure 5:
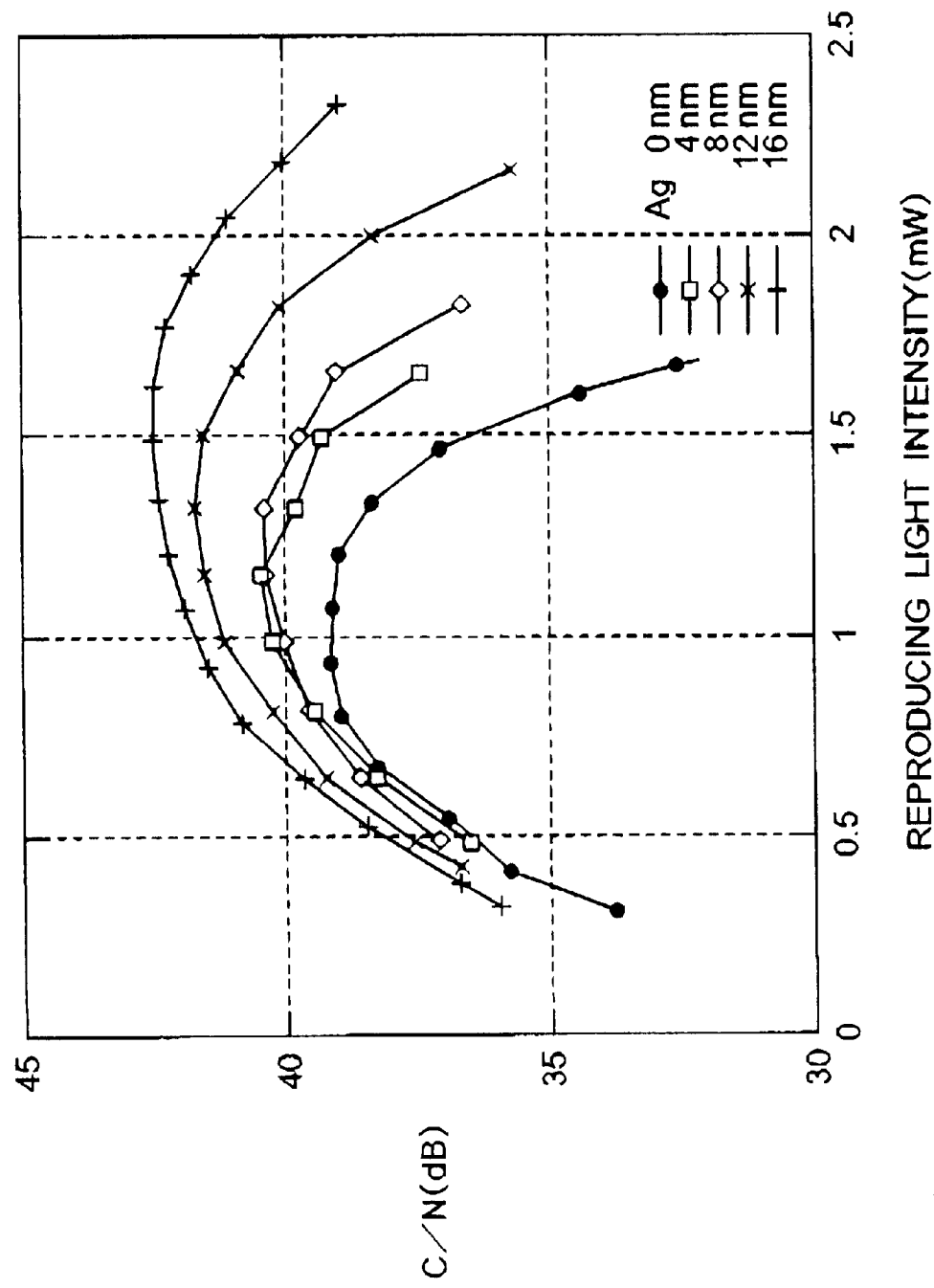
FIG. 5 is a graph for explaining the characteristic (C/N) of the magneto-optical recording layer according to a third embodiment of the present invention.
Figure 6:
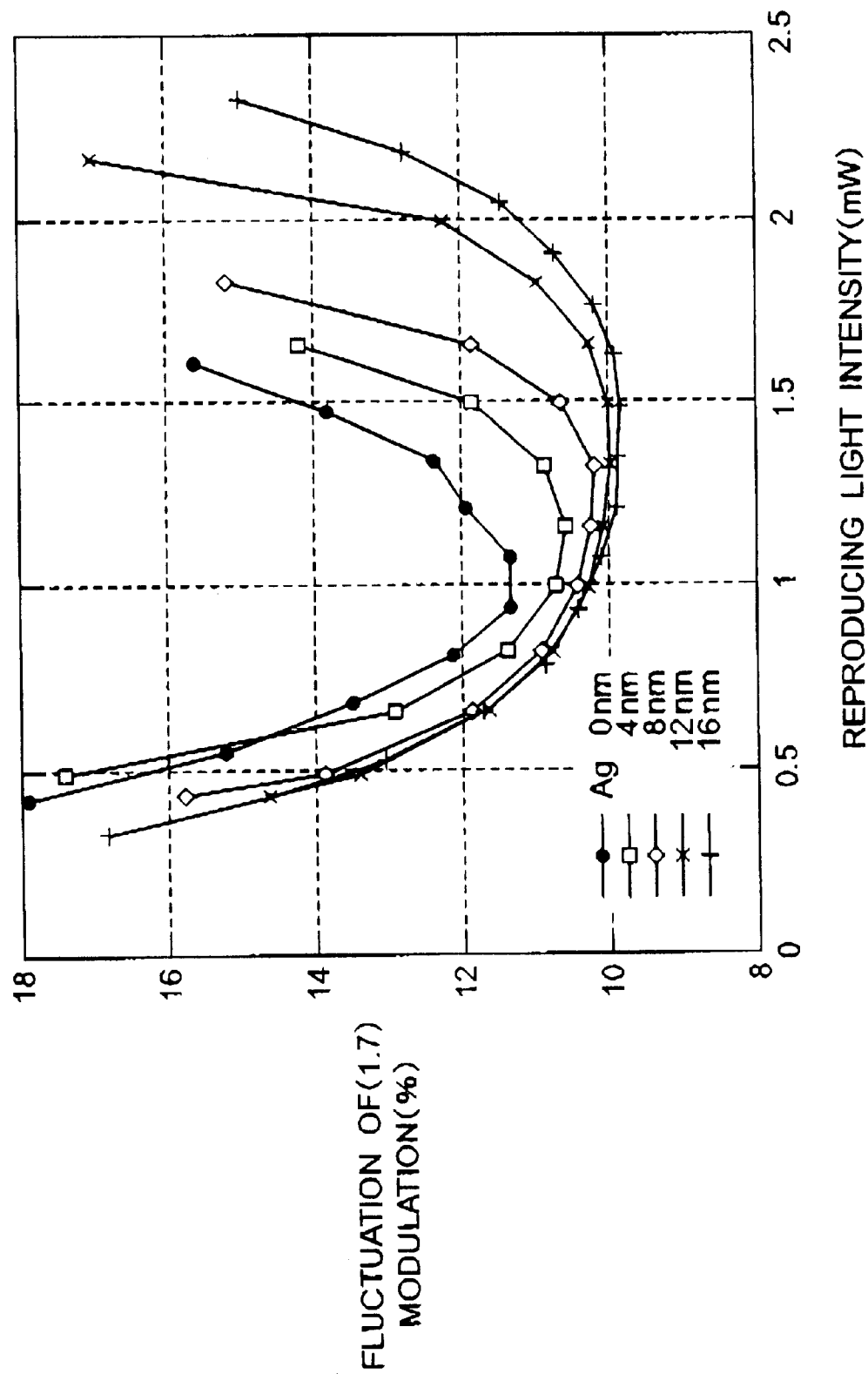
FIG. 6 is a graph for explaining the characteristic (fluctuation) of the magneto-optical recording layer according to the third embodiment of the present invention.

FIG. 5 and FIG. 6 respectively show dependencies of C/N and fluctuation on the intensity of reproducing light. As shown in FIG. 5 and FIG. 6, along with increasing the thickness of the light transmitting metal layer, the C/N and the fluctuation peak at a higher intensity of reproducing light. Further, the thicker the light transmitting metal layer, the more the C/N and fluctuation are respectively improved. Also, it is found that the distribution of the intensity of reproducing light, that is, the margin of the intensity of reproducing light, becomes broader when the light transmitting metal layer becomes thick.

Also, in these graphs, the improvement of performance is remarkable when the thickness of the light transmitting metal layer is 10 nm or more. When the thickness of the light transmitting metal layer is thicker than 16 nm, the intensity of the recording light was insufficient with the above experimental system, so data is not shown. However, when using a light source of a higher intensity, when decreasing the linear velocity of recording, when the NA is high and the spot size of focused light is small, or when the wavelength is shorter, a higher performance can be obtained by making the light transmitting metal layer thicker than the above experimental system (16 nm or more).

When a large amount of an additive is included for improving the corrosion resistance of the light transmitting metal layer, generally the heat conductivity of the light transmitting metal layer decreases. In this case, a high performance can be also obtained by making the thickness of the light transmitting metal layer greater.

Note that while results in the above evaluation system were shown here for showing only the change of the heat characteristics, a similar tendency in the change of the heat characteristics was also observed in the case of a wavelength of light of 488 nm. Further, the same was true of the case of a wavelength of 640 nm and an NA=0.85. Also, it is considered that a similar effect can be obtained in the case of a combination of another wavelength and NA satisfying wavelength/NA of about 1000 nm or less.

In the above experimental system, as explained in the first embodiment, samples subjected to a flattening treatment by the reverse sputtering on the surface of the metal layer were used. On the other hand, when the reverse sputtering was not performed, a decline of the C/N of 3 dB or more was observed in the above experimental conditions. Due to this, it is found that reverse sputtering or etching and other flattening treatment on the surface of the light transmitting metal layer is effective to decrease noise.

Figure 1:
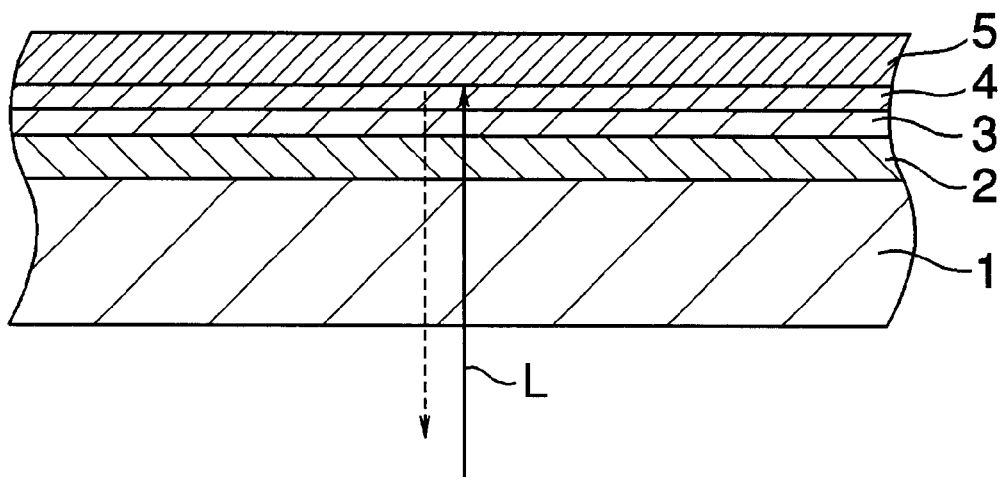
FIG. 1 is a cross-sectional view of a conventional magneto-optical recording medium.

Note that when increasing the thickness of the metal reflective layer 5 in the conventional configuration shown in FIG. 1, almost no trend of improvement of the C/N, jitter, or other characteristics as described above was observed. From this, the configuration of the present invention with the light transmitting metal layer formed contacting the magneto-optical recording layer and with the thickness of the light transmitting metal layer controlled is found to be effective to improve the characteristics of a magneto-optical recording medium.

(Fourth Embodiment)

Next, it will be explained that the film configuration of the magneto-optical recording medium of the present invention is especially effective when the wavelength/NA is 1000 nm or more with examples combining some wavelengths and NAs.

The disk of a conventional configuration shown in FIG. 1 and the medium of the present invention were compared using a blue light source (wavelength 407 nm, NA=0.60, wavelength/NA=680 nm), a red light source 1 (wavelength 640 nm, NA=0.85, wavelength/NA=750 nm), and a red light source 2 (wavelength 660 nm, NA=0.70, wavelength/NA=940 nm). Though the spots of the three optical systems were different each other, the difference of the spot diameters between the blue light source and the red light source 1 was about 10%. Therefore, it can be regarded as almost same level. As shown in FIG. 7, when increasing the intensity of the reproducing light, the temperature within the spot gradually rises. Along with this, the Kerr rotation angle decreases, therefore the carrier level decreases. In other words, it is shown that the carrier level/reproducing light intensity is maintained at 0 dB when not decreasing the Kerr effect, but the greater the decrease from there, the higher the temperature.

FIGS. 7A and 7B respectively show the results of the blue light source and the red light source 1. When comparing the disk of the present invention and the conventional disk from these graphs, it is found that the heat characteristics of the disk of the present intention are obviously improved and the decrease of the carrier level is small. Further, when comparing these optical systems, if the diameters of light spots are almost same level, it is found that almost same improvement in the heat characteristics can be obtained. In other words, the effect of the present invention is not due to the wavelength or NA, but is an effect available when the diameter of the spot is small.

FIG. 7C shows the result of the red light source 2, but the heat characteristics are greatly changed due to a large spot diameter and it is found that the effect cannot be obtained as much as FIGS. 7A and 7B. However, at a high intensity of reproducing light of 3 mW in this optical system, the carrier level of the disk of the present invention is high and the effect is observed. Also, since the difference becomes smaller when the spot is larger, it is found that the effect of the present invention is effective if the wavelength/NA is 1000 nm or less.

Figure 8:
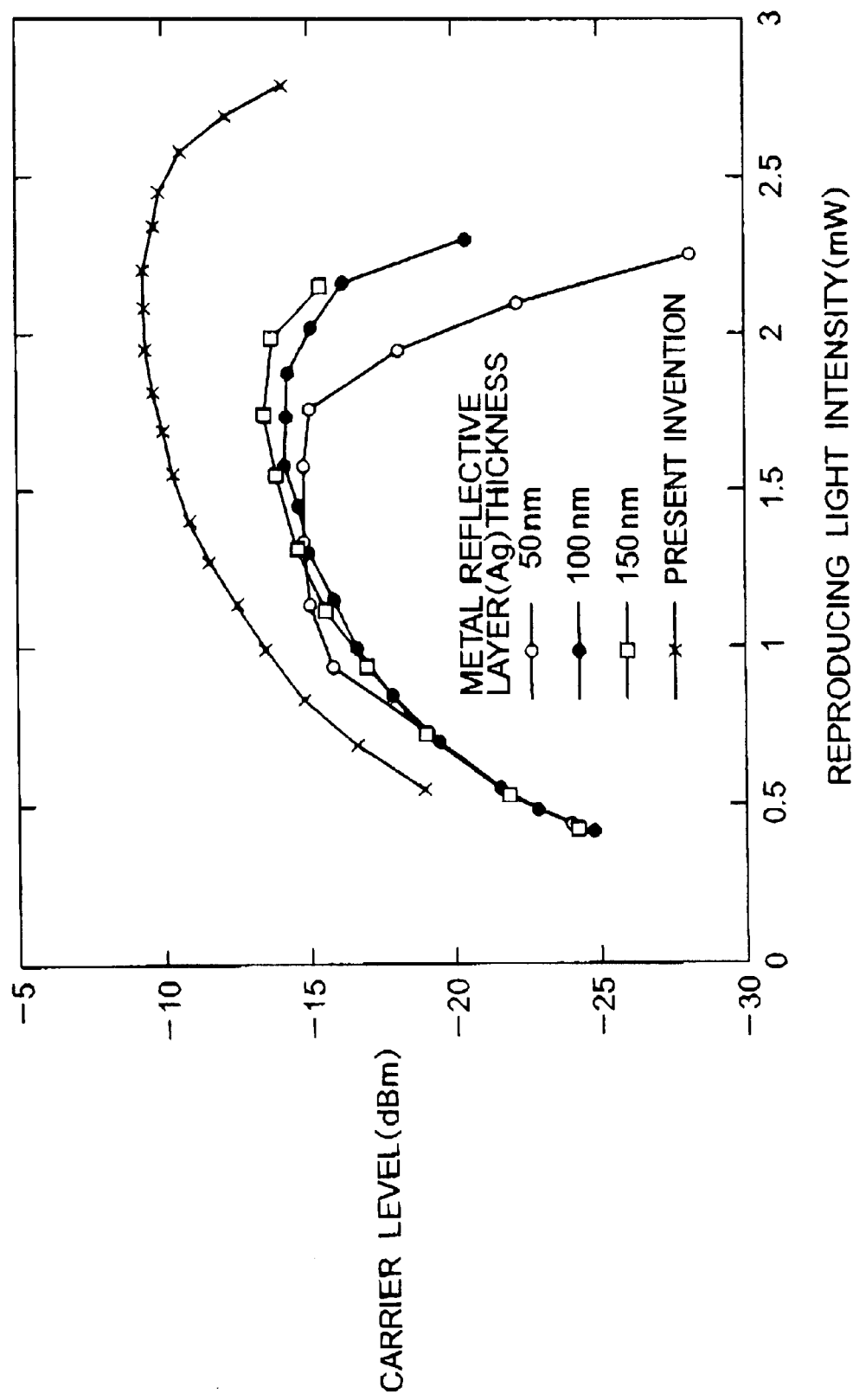
FIG. 8 is a graph showing the dependency of the carrier level on the intensity of the reproducing light according to a fourth embodiment of the present invention and comparing the conventional structure wherein the reflective layer is made thick with the structure of the present invention.

FIG. 8 shows the dependency of the carrier level on the intensity of the reproducing light when changing the thickness of the metal reflective layer in the conventional structure and when using the structure of the present invention. The light source is a blue laser (wavelength 407 nm).

The film configuration of the conventional structure was made a substrate, a first dielectric layer (SiN, 59 nm), a magneto-optical recording layer (TbFeCo, 15 nm), a second dielectric layer (SiN, 20 nm), and a metal reflective layer (Ag, x nm). x was set as 50, 100, 150 (nm).

On the other hand, the film configuration of the structure of the present invention was made a substrate, a first dielectric layer (SiN, 59 nm), a magneto-optical recording layer (TbFeCo, 15 nm), a light transmitting metal layer (Ag, 5 nm), a second dielectric layer (SiN, 20 nm), and a metal reflective layer (Ag, 50 nm). Also, the various conditions in the evaluating system were set as follows: a track pitch of 0.50 μm, a recording mark length of 0.307 μm, and a linear velocity of 4.62 m/sec.

As shown in FIG. 8, in the case of the conventional structure, the characteristics were not changed much at all even when changing the thickness of the metal reflective layer. However, when using the structure of the present invention, the characteristics were remarkably improved. Also, while the thickness of the light transmitting metal layer was set to 5 nm in the present embodiment, the characteristics are improved in the case of a thickness of 5 nm compared with the conventional structure. From the third embodiment, if making the thickness in the structure of the present invention for example 10 nm, it is expected that similar or better characteristics than the case of the thickness of 5 nm or more can be obtained.

FIG. 9 shows the dependency of the carrier level on the intensity of reproducing light when changing the thickness of the second dielectric layer in the conventional structure and when using the structure of the present invention. The thickness of the metal reflective layer was made constant. Also, the thickness of the first dielectric layer was set so that the samples became the same in reflectance using the effect of multiple interference. The light source was, in the same manner as the case of FIG. 8, a blue laser (wavelength 407 nm).

The film configuration in the conventional structure was a substrate, a first dielectric layer (SiN, 43 to 59 nm), a magneto-optical recording layer (TbFeCo, 15 nm), a second dielectric layer (SiN, x nm), and a metal reflective layer (Ag, 50 nm). x was set to 5, 10, 20 (nm).

On the other hand, the film configuration of the structure of the present invention was made a substrate, a first dielectric layer (SiN, 59 nm), a magneto-optical recording layer (TbFeCo, 15 nm), a light transmitting metal layer (Ag, 5 nm), a second dielectric layer (SiN, 20 nm), and a metal reflective layer (Ag, 50 nm). Also, the various conditions in the evaluating system were set as follows: a track pitch of 0.50 μm, a recording mark length of 0.307 μm, and a linear velocity of 4.62 m/sec.

When using a red light source and NA=0.5 or so, it is known that the heat characteristics are improved by making the thickness of the second dielectric layer formed between the magneto-optical recording layer and the metal reflective layer thinner since the absorbed heat at the magneto-optical recording layer is made to disperse quickly in the metal reflective layer. Though a similar effect was expected, actually as shown in FIG. 9, in the case of the blue light source, improvement in the heat characteristics was rarely observed when making the second dielectric layer thinner in the conventional structure.

On the other hand, when using the structure of the present invention, the characteristics were remarkably improved. Also, while the thickness of the light transmitting metal layer was set to 5 nm in the present embodiment, in the case of the thickness of 5 nm, the characteristics are improved compared with the conventional structure. From the third embodiment, it is expected that similar or better characteristics will be shown if making the thickness for example 10 nm in the structure of the present invention compared with the case of the thickness of 5 nm or more.

As described above, according to the above magneto-optical recording medium of the present embodiment, by arranging a light transmitting metal layer having a larger heat dispersion than the magneto-optical recording layer contacting the magneto-optical recording layer, it is possible to improve the substantive heat conductivity of the magneto-optical recording layer. Particularly, when using a blue light source and when using a high NA, it is also possible to improve the C/N.

Also, in the above embodiment, while the case was shown wherein the magneto-optical recording layer and the first and second dielectric layers were each made single-layer structures, it is also possible to make each layer a multilayer structure or comprise the layer by other materials. In addition, various modifications may be made within the range not outside the gist of the present invention.

According to the magneto-optical recording medium of the present invention, since a light transmitting metal layer having a higher dispersion of heat than the magneto-optical recording layer is arranged next to the magneto-optical recording layer, the substantive heat conductivity of the magneto-optical recording layer increases. Due to this, when focusing the reproducing light on the magneto-optical recording layer, energy of light absorbed locally at the magneto-optical recording layer disperses quickly and a local temperature rise is prevented. Therefore, the intensity of the reproducing light can be increased and the S/N and C/N can be improved.

Also, according to the magneto-optical recording medium of the present invention, since the light transmitting metal layer is arranged at the side of the magneto-optical recording layer opposite to the side which the light strikes, it is possible to improve the heat characteristics without causing a deterioration of the optical characteristics.

What is claimed is:

1. A magneto-optical recording medium for an optical system having a ratio of wavelength to numerical aperture of lens being not more than about 1000 nm, the magneto-optical recording medium comprising:
   a first light transmitting dielectric layer to a first surface of which the light strikes;
   a magneto-optical recording layer formed on a second surface opposed to the first surface of the first dielectric layer;
   a light transmitting metal layer formed on the magneto-optical recording layer having a larger heat conductivity than the magneto-optical recording layer;
   a second light transmitting dielectric layer formed on the light transmitting metal layer; and
   a metal reflective layer formed on the second dielectric layer and reflecting layer, wherein the thickness of the light transmitting metal layer is not less than about 10 nm and not more than about 60 nm.

2. A magneto-optical recording medium as set forth in claim 1, wherein the light transmitting metal layer is comprised of a metal having a large reflectance with respect to the light.

3. A magneto-optical recording medium as set forth in claim 2, wherein the light transmitting metal layer contains Al.

4. A magneto-optical recording medium as set forth in claim 2, wherein the light transmitting metal layer contains Ag.

5. A magneto-optical recording medium as set forth in claim 1, further comprising a substrate on the first surface of the first dielectric layer.

6. A magneto-optical recording medium as set forth in claim 1, further comprising a substrate at the opposite surface to the side of the metal reflective layer which the light strikes.

7. A method of producing a magneto-optical recording medium for an optical system having a ration of wavelength to numerical aperture of lens of not more than about 1000 nm,
   said method comprising the steps of:
      forming a light transmitting first dielectric layer on the surface of the light transmitting substrate at the side opposite to the side which the light strikes;
      forming a magneto-optical recording layer on the first dielectric layer;
      forming on the magneto-optical recording layer a light transmitting metal layer having a larger heat conductivity than the magneto-optical recording layer, the light transmitting metal layer being not less than about 10 nm and not more than about 60 nm;
      forming a light transmitting second dielectric layer on the light transmitting metal layer; and
      forming a metal reflective layer reflecting light on the second dielectric layer.

8. A method of producing a magneto-optical recording medium as set forth in claim 7, wherein the steps of forming the first dielectric layer, the magneto-optical recording layer, the light transmitting metal layer, the second dielectric layer, and the metal reflective layer comprise forming layers by sputtering.

9. A method of producing a magneto-optical recording medium as set forth in claim 8, wherein the sputtering steps are performed in the same apparatus.

10. A method of producing a magneto-optical recording medium as set forth in claim 7, further comprising the step of flattening a surface of the light transmitting metal layer after the step of forming the light transmitting metal layer.

11. A method of producing a magneto-optical recording medium as set forth in claim 10, wherein the step of flattening the surface of the light transmitting metal layer comprises the step of reverse sputtering.

12. A method of producing a magneto-optical recording medium as set forth in claim 11, wherein the steps of forming the first dielectric layer, the magneto-optical recording layer, the light transmitting metal layer, the second dielectric layer and the metal reflective layer comprise forming layers by sputtering, and
   the reverse sputtering is performed in the same apparatus as the sputtering steps.

13. A method of producing a magneto-optical recording medium for an optical system having a ration of wavelength to numerical aperture of lens of not more than about 1000 nm,
   said method comprising the steps of:
      forming a metal reflective layer reflecting the light on a surface of the substrate at the side which the light is focused on;
      forming a light transmitting second dielectric layer on the metal reflective layer;
      forming on the second dielectric layer a light transmitting metal layer having a larger heat conductivity than the magneto-optical recording layer, the light transmitting metal layer being not less than about 10 nm and not more than about 60 nm;
      forming the magneto-optical recording layer on the light transmitting metal layer; and
      forming a light transmitting first dielectric layer on the magneto-optical recording layer.

14. A method of producing a magneto-optical recording medium as set forth in claim 13, wherein the steps of forming the metal reflective layer, the second dielectric layer, the light transmitting metal layer, the magneto-optical recording layer, and the first dielectric layer comprise forming layers by sputtering.

15. A method of producing a magneto-optical recording medium as set forth in claim 14, wherein the sputtering steps are performed in the same apparatus.

16. A method of producing a magneto-optical recording medium as set forth in claim 13, further comprising the step of flattening a surface of the light transmitting metal layer after the step of forming the light transmitting metal layer.

17. A method of producing a magneto-optical recording medium as set forth in claim 16, wherein the step of flattening the surface of the light transmitting metal layer comprises the step of reverse sputtering.

18. A method of producing a magneto-optical recording medium as set forth in claim 17, wherein the steps of forming the first dielectric layer, the magneto-optical recording layer, the light transmitting metal layer, the second dielectric layer and the metal reflective layer comprise forming layers by sputtering, and the reverse sputtering is performed in the same apparatus as the sputtering steps.

* * * * *